April 19, 1966  G. T. RANDOL  3,246,578
REACTION-TRANSMITTING MECHANISM ADAPTED FOR BRAKE
BOOSTER MOTOR USE
Original Filed Sept. 21, 1962
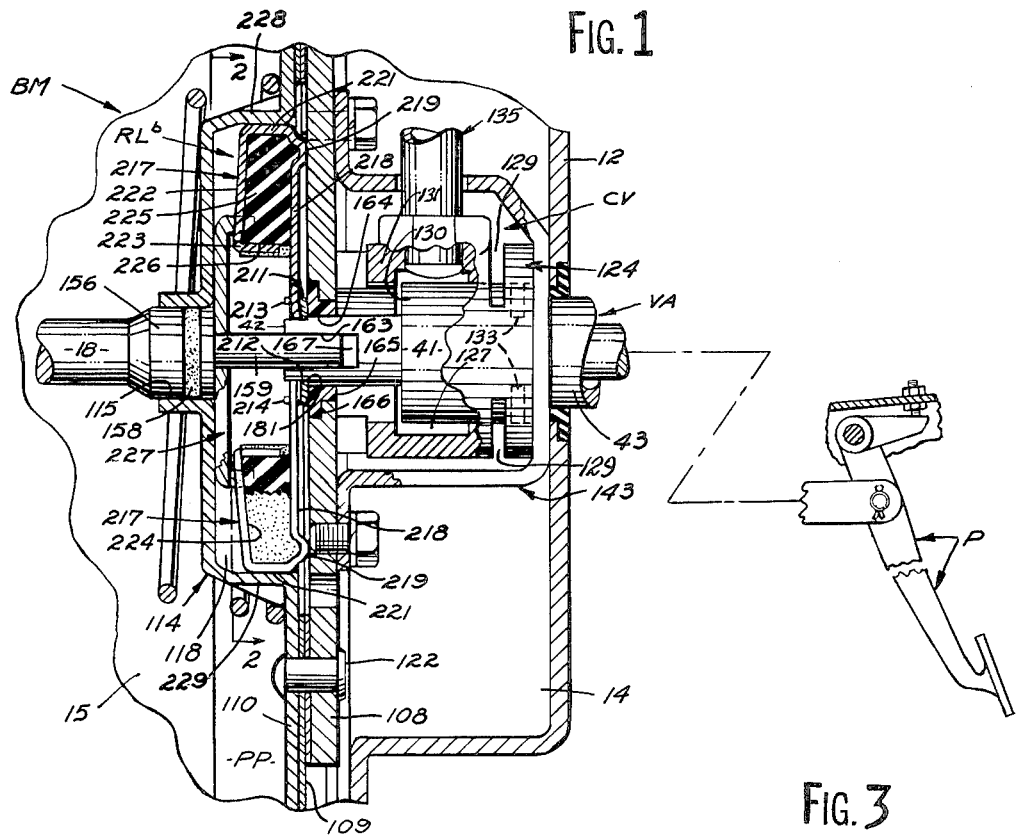
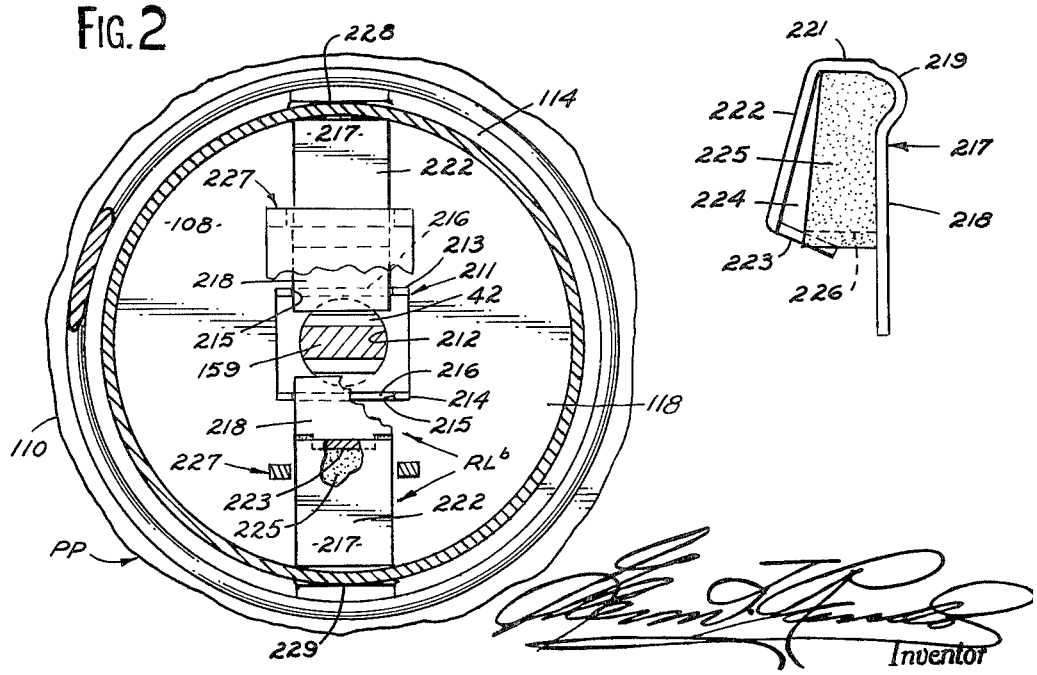
Inventor

United States Patent Office 3,246,578
Patented Apr. 19, 1966

3,246,578
REACTION - TRANSMITTING MECHANISM ADAPTED FOR BRAKE BOOSTER MOTOR USE
Glenn T. Randol, P.O. Box 275,
Mountain Lake Park, Md.
Original application Sept. 21, 1962, Ser. No. 225,427. Divided and this application May 11, 1965, Ser. No. 454,878
8 Claims. (Cl. 91—369)

This application is a division of my copending application Serial No. 225,427 filed September 21, 1962 now issued to Patent No. 3,209,657 dated October 5, 1965.

The invention relates to novel reaction-transmitting mechanism disclosed in said earlier filed application and illustrated by way of example, in operative association with my novel brake booster motor having a power member operated by a pressure differential and wherein said mechanism is operatively embodied between said power member and the work output element movable in part thereby with portions of said mechanism being responsive to initial operator-actuation effective to subject said work element to a predetermined resistance to movement for conditioning said mechanism to transmit a portion of the reaction from said work element to the operator upon operative energization of said power member reaching sufficient magnitude in cooperation with operator-actuation control thereof to overcome said predetermined resistance (work-load) to additionally move said work element.

Workers in the art to which the present invention relates, have heretofore proposed various pressure-sensing devices adapted for transmitting to the operator through the medium, for example, of a pedal an awareness of the energized status of booster motors employed to assist in operating the conventional hydraulic brake system on automotive vehicles and the like, but none of such proposals provides a reaction-transmitting system in which a plurality of radially-arranged composite levers characterized by lever-action is combined with resiliency of a rubber block or the like embodied between at least two spaced segmental portions comprising each of the levers, said segmental portions being characterized by limited relative movement toward each other from normal position to deform the interposed block to produce in conjunction with the aforesaid lever-action the means for transmitting a portion of the reaction from said work element to the operator.

The primary objective, therefore, of the present invention is to provide a reaction mechanism or system of the latter type wherein lever-action is combined in a novel manner with a pliant element disposed in each of a plurality of radially arranged composite levers to produce a progressively increasing resistance to movement of an operator-operated member (brake-pedal) and the booster power member as a function of reaction from the work-performing element adapted to operate, for example, the master brake cylinder (not shown) whereby the operator is provided with a highly desirable "pedal feel" to enable him to predictably regulate the degree of braking force as required.

Another object of the invention seeks to provide novel mechanism for reaction-transmission from a work-load to an operator-operated member capable of controlling a power force whereby the reaction force transmittable to the operator member is a factor of the blending of mechanical leverage and a resilient element embodied directly in said mechanical leverage, to provide a progressively increasing resistance to movement of the operator member upon operative energization of said power force to assist in the movement and pressure exerted on a force-applying element effective on said work-load.

Additional objects, advantages and features of the invention will become apparent from the following detailed description considered in connection with the accompanying drawing wherein a preferred embodiment of the invention is exemplarily illustrated as follows:

FIGURE 1 depicts my novel reaction-transmitting mechanism embodied in a booster brake motor controllable in part by an operator-operated pedal, said mechanism being shown in normal relaxed disposition;

FIGURE 2 is a transverse section taken along the line 2—2 of FIGURE 1 showing further particulars of the reaction mechanism; and FIGURE 3 is a fragmentary sectional view taken on an enlarged scale from FIGURE 1 showing one of the reaction levers per se in assembled status prior to installation in the booster motor.

Referring now to the drawing, my novel and improved reaction-transmitting mechanism is shown in operative association with a power unit herein disclosed in the form of a pressure differential operated booster motor generally designated BM and shown fragmentarily by FIGURE 1, said motor comprising a cup-shaped power cylinder which utilizes a detachable cup-shaped member 12 to close its open end, and a power assembly illustrated herein as a power-piston PP reciprocably mounted for movement within said power cylinder, and which serves to divide said cylinder interior into opposing fluid chambers 14, 15, said chamber 14 being characterized by being subjected to a variable pressure (air-vacuum) and the other chamber 15 being continuously charged with a negative pressure (vacuum) with both of said chambers being normally balanced at negative pressure level when the power-piston PP is in normal position as shown in FIGURE 1, thus the present booster motor BM is commercially known as the vacuum-suspended type as distinguished from the air-suspended type characterized by equivalent atmospheric pressure conditions present in both of said chambers when the motor is de-energized.

The aforesaid differential pressure is created by admitting air at atmospheric pressure level into chamber 14 under control of a follow-up control valve mechanism generally designated CV which in operation under influence in part of an operator-operated member herein illustrated in the form of the conventional suspended-type brake-pedal P, activates a valve actuator VA herein disclosed as a valve-carrying unit of composite construction and characterized by rectilinear movement. The valve actuator comprises an inner valve element 41 and a portion 42 projecting forwardly therefrom and a tubular portion 43 which projects rearward through a central opening in the closure member 12 for connection to the brake-pedal P.

The power-piston PP comprises a preferably circular master thrust plate 108 which backs a juxtaposed first thrust plate 109 of annular configuration, and a secondary support and sealing plate 110 characterized by a centrally extruded embossment 114 with a flanged central circular opening 115, to produce an enclosure (chamber) 118 with its rear open end closed by said master plate. These three plates are assembled as shown in FIGURE 1 by means of a plurality of rivets 122 or otherwise, to produce said power assembly.

An outer valve member (sleeve) 124 is connected to move as a unit with the power-piston PP by means of a valve cage 143 whereby operator force applied to the valve actuator VA effects simultaneous rectilinear movement of the inner valve element 41 relative to the outer valve member, and thereby producing in operative association with the outer valve member 124 moving as a unit with said power-piston PP, the requisite follow-up operation of control by said control valve CV to connect the power cylinder chamber 14 to atmosphere to create a pressure differential across said power-piston to operatively energize the same.

The power cylinder chamber 15 continuously communicates with a vacuum source (not shown) via a conduit 135, and an annular vacuum chamber 127 formed in the outer valve member 124 as shown in FIGURE 1. This latter member is also provided with a pair of diametrically opposed air-vacuum slots 129 which maintains communication between the power cylinder chamber 14 and said inner valve element. Spaced forwardly from these slots is an annular end wall 131 defining the forward end of said valve chamber 127. The inner valve element is provided with an annular working land 130 and a pair of diametrically opposed air-slots 133 which cooperate with said end wall and slots 129, respectively, to selectively connect said vacuum chamber 127 to the power cylinder chamber 14 and to isolate the latter two chambers in synchronism with the slots 129 and air-slots 133 being placed in and out of registry, respectively, to produce the aforesaid pressure differential in said power cylinder chambers 14, 15 when said valve chamber 127 is isolated and said slots 129, 133 in communication with each other for induction of atmospheric pressure into the power cylinder chamber 14 under follow-up control of said control valve CV as is understood.

The booster work-performing element (push-rod) 18 operates the master cylinder piston (not shown), and the opposite rear end portion of said push-rod is formed with an enlarged diameter cylindrical portion 156 fitted with an annular packing 158 and which slidably interfits the aforesaid opening 115 in airtight sealed relation to isolate the chamber 118 from chamber 15 as shown in FIGURE 1. This enlarged portion of the push-rod terminates in a narrow extension 159 of substantially rectangular cross section which projects into the bifurcated forward end 42 defining a horizontal cross-slot 163. The forward portion 42 also projects through and is slidably supported by a complemental aperture 164 in a preferably plastic bearing element 165 incorporated in a central opening 166 formed in the master plate 108 of the power-piston PP as shown in FIGURE 1. It should be importantly noted here that the bottom of the cross-slot 163 is normally spaced at 167 from the confronting end of the narrow extension 159 to provide the required relative operating movement between the valve actuator VA and outer valve sleeve 124 for follow-up operation of the aforesaid control valve CV between its "off" and wide open operating positions of control.

When the bottom of the cross-slot 163 engages the end of the push-rod extension 159, operator force may be applied directly to the booster push-rod 18 to operate the master brake cylinder (not shown) "straight-through" in cooperation with or independently of booster power-assist. Movement of the valve actuator VA under operator-actuation is transmitted to the booster push-rod 18 through my novel reaction-transmitting mechanism (device) generally designated "RL^b" and which comprises: a pressure plate 211 centrally apertured at 212 to receive the reduced ends of the bifurcated portion 42 of the valve actuator VA, and which is stabilized on the portion 42 by shoulders 181 to have unitary movement with said valve actuator. The lower and upper ends of this plate terminate in horizontal forwardly projecting flanges 213, 214, respectively, with each flange notched at 215 to provide a pressure point generally designated 216, for the inner ends of the composite reaction levers of springy loop-shaped construction and generally designated 217.

Each of the reaction levers 217 is formed with an outwardly extending radial segment (arm) 218 normally parallel to the left side of the master thrust plate 108 with an arcuate offset portion 219 projecting from the outer end portion toward and in contiguous relationship to said thrust plate. The outer end portion above said offset portion takes the form of a springy arch 221 terminating in an inwardly extending radial segment (arm) 222 preferably spaced at an angle from the confronting portion of the outwardly extending segment. The inner end of the segment 222 terminates in a substantially horizontal narrower segment (arm) 223 with the free end thereof spaced from the outwardly extending segment to provide normally a substantially triangular opening 224 adapted to receive a resilient block of rubber 225 of the same general configuration.

A channel 226 is provided in the inner end surface coextensive with the length of the rubber block and which receives the narrow segment 223 to stabilize the rubber blocks within their respective enclosures defined by the configuration of the radial segments and connecting springy arch 221 comprising each of said levers as above described, said channel also enabling the inwardly extending segment 222 and horizontal segment 223 to have yielding relative movement toward the outwardly extending segment 218 when the rubber blocks under compression induced by the levers under reactive force from the master brake cylinder (not shown).

The juncture of the inwardly extending and horizontal segments 222, 223, respectively, pushes against opposite ends of a fulcrum member 227 mounted on the booster push-rod 18 to bear against opposed shoulders defining the juncture of the cylindrical element 156 and rectangular extension 159 projecting coaxially therefrom. The left side of member 227 normally lies in contact with the inner confronting face of the embossment 114 on the secondary plate 110 as shown, and the tapered cylindrical wall of the embossment overlying the outer ends of the levers 217, is depressed parallelly to the axis of the booster push-rod to lie in close adjacency to the arched ends aforesaid to prevent fortuitous radial displacement of the two reaction levers 217, thus stabilizing them in operating positions. The normal angular relationship of the inwardly extending and outwardly extending segments of the levers 217 is demonstrated by FIGURE 3 wherein said segment 222 is angularly spaced from the left side of the rubber block, but when the levers are installed as shown in FIGURE 1, segments 218, 222 are biased toward each other to not only place some tension in the levers proper as required for the reactive transmission effect desired but also preferably to a minute degree in the rubber blocks. Thus, when the valve actuator VA moves to the left from normal position of FIGURE 1, immediate resistance is encountered to pedal movement which builds up progressively as the booster power-piston PP becomes increasingly operatively energized.

In operation, with the parts in relative positions as shown in FIGURE 1, initial movement of the valve actuator VA under operator-actuation, pushes on the inner ends of the reaction levers 217 producing a tendency for the outwardly extending segments to rotate clockwise on their arcuate offset portions abutting the forward face of the master thrust plate 108, and at the same time the power-piston PP under influence of pressure differential created in the manner aforesaid acts through said arcuate offsets to transmit movement via the inwardly extending segments 222 to the fulcrum member 227 thence to the booster push-rod 18 to move the master cylinder piston (not shown) for brake operation. This combined action of operator force and power force reduces the size and modifies the shape of the opening in which the rubber blocks, respectively, are disposed thus causing the rubber blocks to correspondingly deform according to their inherent consistency to resist deformation in relation to the degree of pressure acting thereon as a function of limited movement of the radial segments toward each other, and thereby supplementing the resistance produced by the increasing buildup of tension in the levers under reaction from the master brake cylinder (not shown).

The two diametrically opposed areas 228, 229 on the master thrust plate 108 in contact with the arcuate offset portions on the levers 217, define the outer pressure points while the inner ends of the levers are acted on by the bottoms of the notches in the lower and upper flanges 213, 214 which serve as the inner pressure points for the levers 217 and which are charactererized by both resiliency, that is, capable of yielding, and mechanical lever-action, the latter operating characteristic effecting the deformation of the rubber blocks to produce the combined resilient resistance to pedal movement as a measure of the brake-applying operation under joint influence of operator and power forces as is understood.

It should be manifest from the foregoing illustration and description of my invention that I have produced a novel lever-type reaction-transmitting mechanism for booster motors which provides special advantages, particularly in the provision of what may be termed a "soft" pedal feel without sacrificing predictable control over the operative energization of the booster motor. The reaction-lever device $RL^b$ provides a wide range of variables in leverage ratio resiliency as a product of the combination of mechanical leverage with a resilient element, to enable the operator (driver) to sense the degree of brake application, such structural variations in the reaction device being incorporable in the disclosed booster motor or other booster designs according to the requirements of the particular installation and driver's choice with respect to "pedal feel" desired.

A preferred embodiment of the invention has been illustrated and described. However, it is obvious that modifications, changes and variations may be made by workers in the art to which the invention relates without departing from the proper scope or fair meaning of the terms of the subjoined claims.

Having thus described my invention, I claim:

1. In reaction-transmitting mechanism adapted for use in cooperation with a work-performing element to transmit reaction therefrom to a power member operative to exert the major portion of pressure on said element, and to a personally-actuatable member effective to control operation of said power member and simultaneously exert the balance of pressure on said element, comprising a plurality of radially extending loop-shaped spring levers, each having a radially extending segment with an arcuate portion offset at its outer end into engagement with said power member, and the inner end in engagement with an extension coaxially projecting from said personal member, another radially extending segment normally spaced from said first-defined segment, and which is interconnected with an arched portion defining the extreme outer ends of both radial segments and including a horizontal segment projecting from the inner end of the other radial segment toward said first-defined segment in spaced relationship thereto, and a resilient block confined in the space defined by said segments in substantially the same configuration as the space obtaining within said segments in operating disposition; and a fulcrum member coaxially mounted on said work element for movement as a unit therewith, with its peripheral portion engaging the inner end of the other radial segment whereby forces transmitted by said personal member and power member to said first-defined segment are progressively resisted as a function of the inherent opposition of the levers to yield supplemented by resistance of said block against compressive deformation by said radial segments in response to reaction transmitted by said work element via said fulcrum member when said power and personal members are operatively cooperating.

2. In reaction-transmitting mechanism adapted for use in cooperation with a work-performing element to transmit reaction therefrom to a power member operative to activate in part said work element, and to a personally-operable member effective to control and cooperate with said power member to complete activation of said work element, comprising a movable member, a pressure area on said power member, another pressure area on said movable member radially spaced from said first-defined pressure area; a fulcrum area provided on said work element intermediate said pressure areas aforesaid in offset relation thereto; a plurality of radially arranged composite levers, each of said levers being characterized by resiliency and comprising a radially extending segment and an angularly spaced segment depending from and interconnected by an arch segment with the outer end of said first defined segment of said lever, said depending segment terminating in a horizontal segment normal to the inner end of said depending segment and projecting toward said first-defined segment in spaced relationship to the latter segment; a block characterized by resiliency and disposed in the opening produced by said lever segments; an arcuate offset in the outer end of said first-defined segment to serve as a pivotal point for said lever on said pressure area of said power member, the inner end of said first-defined segment being engageable by the pressure area on said movable member; and means for transmitting operator force from said personal member to said movable member to reduce and modify the opening defined by said lever segments and thereby deforming said block accordingly to provide reaction from said work element via said fulcrum area in engagement with the lower end of said depending segment, thus providing the operator with progressively increasing resistance to sense the amount of work being performed by said work element under joint influence of said power and personal members upon said power member becoming operatively energized.

3. In reaction-transmitting mechanism adapted for use in cooperation with a work-performing element to transmit reaction therefrom when acted on jointly by a pair of cooperating actuatable members, with one of said members being effective to control the other member, comprising a pressure area operatively associated with one of said members; another pressure area operatively associated with the other of said members and radially spaced from the first-defined pressure area; a fulcrum area provided on said work element intermediate said two pressure areas aforesaid in offset relationship thereto; a plurality of reaction-levers arranged in radially extended relationship from an axis common to both of said members, each of said reaction-levers comprising a resilient segment formed with an elongated radial segment having its extremes contiguous to said pressure areas, respectively, an inwardly extending radial segment spaced from the outer end portion of said first-defined segment, and including a horizontal segment normal to the inner end of said inwardly extending segment and projecting toward the first-defined segment in spaced relationship to the latter segment, to produce an opening defined by said segments; a resilient block of substantially the same perimetrical configuration as said opening; a longitudinal channel traversing the lower end of said block for reception of said horizontal segment; and a pressure point at the vertex of said inwardly extending and horizontal segments contiguous to the pressure area on said work element to effect initial tensioning of said radial and upstanding segments and to simultaneously modify the normal size of said opening defined by said segments whereby said block is deformed accordingly under compressive action to conform to the modified status of said opening to supplement the tension in said reaction-levers to jointly transmit a progressively augmented reactive resistance to said actuatable members; and an operator-operated member adapted to actuate one of said actuatable members relatively to said other member to tension said reaction-levers and thereby deforming said block confined therein for joint reaction transmission from said work element.

4. In reaction-transmitting mechanism adapted for use in cooperation with a work-performing element to transmit reaction therefrom to a pair of cooperating actuatable members acting through said mechanism on said work element, with one of said members being adapted to control the other member, comprising a resilient reaction-transmitting member of loop-shaped configuration defined by a pair of spaced segments connected at one end and open at their opposite ends, said segments being characterized by limited relative movement toward each other from normal position; a fulcrum provided on said work element on which one of said segments is rockable; a pair of spaced pressure areas associated with said actuatable members, respectively, on which the extremes of the other segment are rockable, respectively; a resilient block disposed in the space between said segments and which is deformable under compressive force applied by said segments when moved toward each other under actuation of said actuatable members to modulate the space normally obtaining between said segments thereby producing a progressively augmented reaction resistance from said work element against said actuatable members.

5. A reaction-transmitting mechanism constructed in accordance with claim 4 in which said block and reaction members are normally placed under minimal tension simultaneously when installed to provide immediate initial resistance to actuation of said one actuatable member for predictable control of said other actuatable member to intensify the reactive force.

6. In reaction-transmitting mechanism having operative interposition with respect to a pair of actuatable members and a work output element, with one of said members being adapted to control the other member, comprising a composite lever having a pair of spaced arms connected for movement toward each other to reduce the space normally obtaining therebetween, and which is adapted to provide mechanical leverage between said work element and pair of members, and having an interposed cooperative resilient block occupying the space normally obtaining between said pair of arms, and deformable upon movement of the latter toward each other to supplement the springy action of said lever to apply a progressively increasing impositive reaction from said work element on said actuatable members upon actuation of said other member.

7. In reaction-transmitting mechanism having operative interposition with respect to a pair of actuatable members and a work output element, with one of said members being adapted to control the other member, comprising a lever having a pair of spaced arms yieldably connected for movement toward each other, and which is adapted to provide a yielding mechanical leverage between said work element and said pair of members to apply a progressively increasing unproportionate reaction from said work element on both of said actuatable members upon actuation of said other member under control of the one actuatable member.

8. In reaction-transmitting mechanism adapted for use in cooperation with a work-performing element to transmit reaction therefrom to a power member operative to exert the major portion of pressure on said element, and to a personally-actuatable member and simultaneously exert the balance of pressure on said element, comprising a plurality of radially extending looped-shaped springy levers, each having a radially extending segment with an arcuate portion offset at its outer end into engagement with said power member, and the inner end in engagement with an extension coaxially projecting from said personal member, an angularly inwardly extending radial segment interconnected with an arched portion defining the extreme outer ends of both radial segments and including a horizontal segment projecting from the inner end of said angularly extending segment spaced from said first-defined segment; and a fulcrum member coaxially mounted on said work element for movement as a unit therewith, with its peripheral portion engaging the inner end of the angularly extending segment whereby forces transmitted by said personal member and power member to said first-defined segment are progressively resisted as a function of the inherent opposition of said levers to yield in response to reaction transmitted by said work element via said fulcrum member when said power and personal members are operatively cooperating.

References Cited by the Examiner

UNITED STATES PATENTS

| | | | |
|---|---|---|---|
| 2,894,490 | 7/1959 | Ingres | 91—369 |
| 2,900,963 | 8/1959 | Ayers | 91—369 |
| 3,026,853 | 3/1962 | Stelzer | 91—369 |

SAMUEL LEVINE, *Primary Examiner.*

EDGAR W. GEOGHEGAN, *Examiner.*

P. E. MASLOUSKY, *Assistant Examiner.*